United States Patent [19]

Troeger

[11] 3,807,029
[45] Apr. 30, 1974

[54] METHOD OF MAKING A FLEXURAL PIVOT

[75] Inventor: Henry Troeger, Cooperstown, N.Y.

[73] Assignee: The Bendix Corporation, Teterboro, N.J.

[22] Filed: Sept. 5, 1972

[21] Appl. No.: 286,367

[52] U.S. Cl............... 29/436, 29/416, 267/160, 308/2 A
[51] Int. Cl............................................. B23p 11/00
[58] Field of Search....... 29/416, 412, 436, 149.5 R, 29/149.5 C; 267/160; 308/2 A

[56] References Cited
UNITED STATES PATENTS

| | | | |
|---|---|---|---|
| 3,479,107 | 11/1969 | Blythe et al.......................... | 267/160 |
| 3,319,951 | 5/1967 | Seelig.................................. | 267/160 |
| 3,073,584 | 1/1963 | Troeger .............................. | 267/160 |
| 2,931,092 | 4/1960 | Humphrey........................... | 29/416 |

Primary Examiner—Charles W. Lanham
Assistant Examiner—D. C. Crane
Attorney, Agent, or Firm—Anthony F. Cuoco; S. H. Hartz

[57] ABSTRACT

A method of manufacturing a flexural pivot device comprising the sequential steps of forming a cylindrical housing, forming a plurality of resilient members, inserting the resilient members within the housing and securing the resilient members thereto, milling (such as by electrochemical or electrical discharge means) two diagonally-opposite arcuate annular spaces having radially-inward projections at each end of the housing thereby forming diametrically opposed and overlapping inwardly-projecting arcuate structure, and cutting a circumferential groove in the housing coincident with the overlapping arcuate structure so that limited relative rotation of one arcuate structure relative to the other may occur upon flexing of the resilient means.

7 Claims, 3 Drawing Figures

PATENTED APR 30 1974

3,807,029

METHOD OF MAKING A FLEXURAL PIVOT

FIELD OF THE INVENTION

This invention relates to devices for supporting a mechanism which is to be limitedly rotated about an axis and more particularly concerns improvements in flexural pivot devices which provide limited relative rotation between two parts by flexing crossed, flat springs connecting the two parts.

DESCRIPTION OF THE PRIOR ART

Prior art methods of manufacturing flexural pivot devices such as those disclosed in my commonly assigned U. S. Pat. No. 3,124,873 disclosed a manufacturing process which was more economical than preceding methods. In particular, this patent discloses a simplified method for manufacturing flexural pivot devices wherein four arcuate quadrant elements and two flat springs were assembled, bonded as a unit and then with outer sleeve means cut to form a flexural pivot construction. Although the basic resilient "core" design was unique, it required four quadrant members, two solid and two slotted, which had to be stamped and accurately coined, these springs and the quadrants then had to be assembled and unitized, two diametrically opposed "reliefs" had to be ground on the O. D. of the core, an outer sleeve had to be mounted to the core assembly and then this assembly had to be unitized, the circumferential groove had to be cut therein, and the two ends had to be cut and discarded. Thus, this pivot required essentially five parts and required 15 individual and batch operations.

SUMMARY OF THE INVENTION

In the preferred embodiment according to my invention, the method of making a flexural pivot comprises the steps of forming a cylindrical housing having a plurality of diametrically opposed axially-extending slots, stamping a plurality of substantially I-shaped and D-shaped flat spring elements, assembling the spring elements and inserting them in the slots of the housing, removing metal in said housing to form arcuate annular chambers diametrically opposed at each end of the housing by electrical discharge means, and cutting the housing circumferentially to intersect said diagonally-opposite arcuate chambers thereby providing two cylindrical members having axially-extending arcuate structure interconnected by resilient springs such that one cylindrical member may be limitedly rotated relative to the other cylindrical member by flexing said spring members.

It is, therefore, a primary object of this invention to provide a method of making a flexural pivot which requires fewer parts, fewer manufacturing operations, less material and results in stronger pivots than previous means of manufacture.

Another object of the present invention is to provide an improved method for making a flexural pivot device which is simply constructed and can be made in small sizes and which retains the advantages of no backlash and no friction or wear, and has none of the disadvantages associated with similar devices requiring lubrication at high temperatures.

Still another object is to provide a simplified method for more economically manufacturing flexural pivot devices wherein the freedom of motion spaces and travel gaps which take the form of diagonally-opposite arcuate annular spaces having a radially-inward projection are formed by an electrode conforming to the shape of said annular spaces in an electrochemical or electrical discharge machining operation.

The invention further lies in the methods and the particular organization of the various elements and their cooperative association with one another to produce the beneficial results intended. The foregoing objects and advantages of the invention will appear more fully hereafter from the consideration of the description which follows, taken together with the accompanying drawing wherein a single embodiment of the invention is illustrated. It is to be expressly understood, however, that the drawing is for purpose of illustration and description and not to be construed as defining the limits of the invention.

DETAILED DESCRIPTION OF THE DRAWINGS

Figure 1:
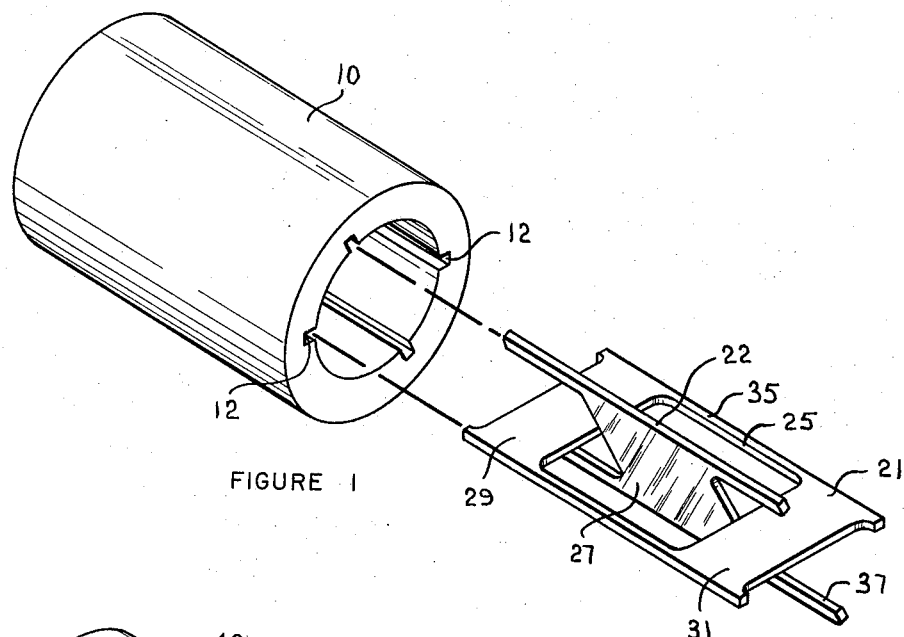
FIG. 1 is an exploded perspective of a housing and resilient means made according to my invention.

Referring to FIG. 1, the main housing 10 is shown as a cylindrical member having four diametrically opposed slots 12 broached therein. Housing 10 can be cast or formed from common bar stock and the slot 12 can be formed by broaching, milling or other conventional means. Two flat springs 21 and 22 are stamped or chemical milled from resilient stock and are assembled as shown. I-shaped spring 22 is slipped through insertion opening 25 in the square-D-shaped spring 21 and the cross element 27 is arranged perpendicular to cross bars 29 and 31 of the square-D-shaped spring 21. Spring 21 has between its cross bars 29 and 31 an axially-extending projection 35. I-shaped spring 22 also has projections 37. It is to be noted that the cross bars 29 and 31 and cross element 27 merge on a radius to the various projections whereby the cross spring elements are better supported and more durable under flexing when brazed to the housing as will be described. It is apparent that two generally I-shaped springs can be used provided the effective width is about equal, as with the total width of the two cross bars 29 and 31 relative to the cross element 27. The various projections, of course, have the same thickness as the cross members since the springs are made from metal sheet. Although only one type of flexural arrangement is shown, it should be noted that a myriad of alternate designs could also be used without departing from my invention. For example, a plurality of flat rectangular flexures or the like as disclosed in my commonly assigned U.S. Pat. No. 3,073,584 could also be successfully employed.

The sub-assembly comprised of the resilient members 21 and 22 and/or the sleeve or housing 10 are plated with the metals capable of forming a brazed attachment of flexures to the housing 10. The sub-assembly is then inserted into housing 10 with the projections 37 and 35 of the resilient members mating with the slots 12 of the housing. The assembly of the flexures in the housing can easily be accomplished with automated equipment. The assembly of housing and flexures is then brazed together, preferably by heating in a controlled non-oxidizing atmosphere at a temperature suitable for providing both brazing and proper heat treatment for best flexure properties. Other means of attaching the flexures to the sleeve such as through various kinds of welding processes may also be used, although these means usually require the use of holding fixtures and the like.

Figure 2:
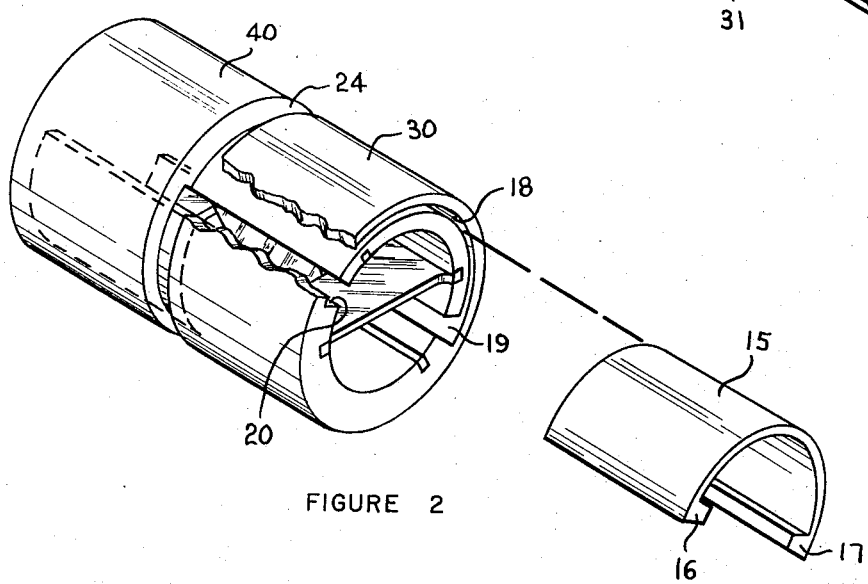
FIG. 2 is a broken away, perspective of the pivot manufactured according to my invention illustrating the orientation of a typical electrode used to form the freedom of motion spaces and the travel gaps.

After brazing and heat treatment, the now one-piece assembly is placed in a machine capable of removing metal by electrochemical, or electrical discharge means. An electrode 15 having a cylindrical form for an angle greater than 180° and having radially inwardly extending projections 16 and 17 is advanced slightly more than half way into the assembly, as shown in FIG. 2, removing metal to form an arcuate annular space 18 and axially extending slots 19 and 20 extending through the inner wall of housing 10. The assembly is then inverted and turned half-way around and the electrode again advanced into the assembly until the axial slots 19 and 20 have been formed throughout the length of the housing 10, thus forming two diagonally-opposite freedom of motion chambers at each end of the housing with the axial slots 19 and 20 providing the necessary travel gap which will later be explained.

A circumferential groove 24 is then cut to meet annular space 18 and the corresponding annular space at the opposite end. These operations result in separating the sleeve or housing 10 into two pieces joined only by the flexures which maintain axial coincidence of housing portions 30 and 40 but because of the flexure's ability to bend sleeve portions 30 and 40 may be rotated with respect to each other through some angle limited by bending stresses in the flexures and the dimension of the travel gaps 19 and 20. Although the flexures of the preferred embodiment of a pivot made according to my invention are shown substantially perpendicular to each other, one skilled in the art will appreciate that in some cases an unequal angular spacing may be desirable.

Figure 3:
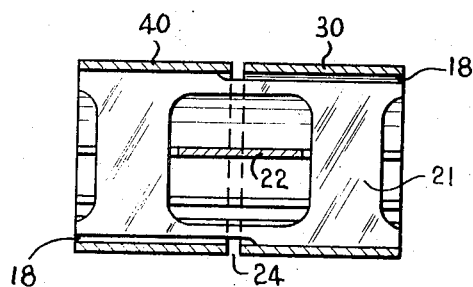
FIG. 3 is a longitudinal, cross-sectional view of a flexural pivot made according to my invention after the center cut has been made whereby one end can be rotated relative to the other end.

Referring to FIG. 3, a flexural pivot made according to the methods of my invention is shown. Notice that the circumferential groove 24 is cut through the housing 10 where the arcuate annular spaces 18 overlap thus forming the two sleeve members 30 and 40. Sleeves 30 and 40 have diametrically-opposed inwardly-projecting arcuate structure interconnected by the springs 21 and 22 so that limited relative rotation of one arcuate structure relative to the other may occur upon flexing of the resilient means.

It is to be understood that changes can be made in the disclosed embodiment and methods by persons skilled in the art without departing from the invention as set forth in the appended claims.

What is claimed is:

1. The method of manufacturing a flexural pivot comprised of:
   providing a housing having resilient receiving means therein;
   forming resilient means to be received within the resilient receiving means of said housing;
   inserting said resilient means within said resilient receiving means;
   removing material from the housing to form diagonally-opposite arcuate annular spaces having radially inward projections; and
   parting said housing circumferentially to intersect said arcuate annular spaces.

2. The method according to claim 1 being further characterized by casting said housing into a hollow cylindrical body.

3. The method according to claim 1 being further characterized by machining a plurality of axially-extending slots within the interior of said housing for receiving said resilient means.

4. The method according to claim 1 wherein said resilient means are formed by stamping two flat spring means having axially-extending projections for insertion within said resilient receiving means.

5. The method according to claim 1 wherein the annular spaces are formed by inserting a substantially semi-circular electrode having radially inwardly extending projections within said housing at the diagonally-opposite ends thereof until the arcuate spaces overlap.

6. The method according to claim 1 wherein the housing is parted by cutting a circumferential groove therein so that said groove intersects said arcuate annular spaces.

7. The method of manufacturing a flexural pivot as claimed in claim 1 further including the step of unitizing said resilient means and said housing.

* * * * *